United States Patent [19]
Ho et al.

[11] Patent Number: 5,555,525
[45] Date of Patent: Sep. 10, 1996

[54] METHOD OF MAKING GRADED REFRACTIVE INDEX POLYMERIC OPTICAL FIBERS AND OPTICAL FIBERS MADE BY THE METHOD

[75] Inventors: Bang C. Ho; Jian-Hong Chen, both of Hsinchu; Shu-Yin Yang, Chun-Lin; Yih-Her Chang, Hsinchu, all of Taiwan

[73] Assignee: Industrial Technology Research Institute, Chutung, Taiwan

[21] Appl. No.: 302,062

[22] Filed: Sep. 7, 1994

[51] Int. Cl.$^6$ ............ G02B 6/00; C08F 120/18; B05D 5/06; B29D 11/00
[52] U.S. Cl. ............ 385/143; 385/141; 385/124; 385/127; 385/128; 526/329.7; 427/162; 427/163.2; 427/372.2; 427/358; 264/1.24; 264/1.29; 264/1.38; 264/1.7
[58] Field of Search ............ 385/143, 145, 385/141, 127, 128, 124; 526/329.7; 427/162, 163.2, 372.2, 358; 264/1.1, 1.24, 1.27, 1.38, 1.6, 1.7, 1.29

[56] References Cited

U.S. PATENT DOCUMENTS

| | | | |
|---|---|---|---|
| 4,125,644 | 11/1978 | Ketley et al. | 427/36 |
| 4,807,964 | 2/1989 | Sare | 385/143 X |
| 4,861,835 | 8/1989 | Maeda et al. | 525/200 |
| 5,235,660 | 8/1993 | Perry et al. | 385/124 |
| 5,378,776 | 1/1995 | Matsumura et al. | 526/64 |

FOREIGN PATENT DOCUMENTS

| | | | |
|---|---|---|---|
| 47-26913 | 10/1972 | Japan | 385/143 X |
| 47-28059 | 10/1972 | Japan | 385/143 X |
| 52-5857 | 1/1977 | Japan | 385/143 X |
| 54-30301 | 3/1979 | Japan | 385/143 X |
| 56-37521 | 4/1981 | Japan | 385/143 X |
| 57-29682 | 2/1982 | Japan | 385/143 X |
| 1-189602 | 7/1989 | Japan | 385/143 X |
| 1-254704 | 10/1989 | Japan | 385/143 X |
| 2-16505 | 1/1990 | Japan | 385/143 X |
| 2-33104 | 2/1990 | Japan | 385/143 X |

*Primary Examiner*—Brian Healy
*Attorney, Agent, or Firm*—W. Wayne Liauh

[57] ABSTRACT

A continuous manufacturing method is provided by extruding a composite optical fiber from two polymeric solutions containing two different monomers having different refractive indices, and then allowing the monomers to diffuse in a diffusion region such that the two monomers are diffused into each other before the optical fiber is hardened.

18 Claims, 2 Drawing Sheets

METHOD OF MAKING GRADED REFRACTIVE INDEX POLYMERIC OPTICAL FIBERS AND OPTICAL FIBERS MADE BY THE METHOD

FIELD OF THE INVENTION

The present invention generally relates to a method of making graded index polymeric optical fibers and, more particularly, relates to a method of making graded index polymeric optical fibers by extruding a polymeric solution containing two monomers having different refractive indices through a die such that the monomers diffuse into each other in a diffusion region, forming a polymeric optical fiber that has a continuous distribution of the refractive index.

BACKGROUND OF THE INVENTION

An optical fiber consists of two basic components namely the core and the cladding. In a typical optical fiber, the optical signal is transmitted through the core of the fiber which has a higher index of refraction than the cladding. The greater index of refraction in the core provides continuous reflection of the optical signal into the core (i.e. a total internal reflection), thus minimizing losses due to refraction into the cladding. An additional buffer layer can also be used to provide protection for the cladding and the core. The buffer layer adds additional mechanical strength to the fiber to prevent cracking and breaking.

There are two different kinds of optical fibers, i.e., the multi-mode fiber and the single-mode fiber. Multi-mode fibers have a relatively large core diameter and provide several different paths for the optical signal to travel. The single-mode fiber is smaller in diameter and allows only a single path for the optical signal.

Multi-mode fibers are available in two different types of core structures or index profiles, a step-index and a graded-index. In a step-index multi-mode fiber, the core is made of a material with a uniform index of refraction, and the cladding material has a different index of refraction. This creates an abrupt interface between the core and the cladding. The advantage of this type of fiber is its ease of connection and splicing due to a large core size where alignment is not critical. A disadvantage of this fiber is that it suffers modal dispersion.

The core of a graded-index multi-mode fiber has a refractive index that gradually decreases toward the outer areas of the core. As light travels to the outer areas of the core it moves faster due to the lower index of refraction. This causes all modes to arrive at the output at the same time, reducing modal dispersion. A graded-index multi-mode fiber is simple to splice and connect due to its larger core diameter.

Single-mode fibers are normally available with a step-index profile, even though some dispersion-shifted fibers are available but are not often used. Since there is only one path through the core, there is no modal dispersion. Single-mode fibers are used for high speed applications and where long distance transmission is required. A single-mode fiber system is a highly reliable one because it utilizes fewer components, such as repeaters, than the multi-mode fibers. The disadvantage of single-mode fibers is the difficulty in connection and splicing due to the extremely small core diameter.

In a step-index fiber, the refractive index of the core and the cladding of the fiber changes drastically at the interface between the core and the cladding. In an optical fiber that has many mode of optical transmission, each mode proceeds at a different speed. There is a serious loss of signal which restricts the frequency bandwidth in an optical fiber that has many modes of optical transmissions. In order to correct this problem, optical fibers having only a single mode of optical transmission are used. The core diameter of a single-mode optical fiber is in the dimension of microns and, therefore, allows only one bundle of light into the core. The light arrives at the end of the fiber at the same time since any possible scattering of a multi-mode fiber is eliminated. A single mode optical fiber also transmits light at a wider bandwidth. However, due to the small core, it is difficult to splice fibers together. It is therefore desirable to provide optical fibers that have gradually changing refractive indices.

Optical fibers that have a continuous distribution of refractive indices from the cladding to the core have been made by others with glass or quartz. However, these types of optical fibers are produced at a very low production rate and very high cost by ion-exchange or sol-gel methods. Optical fibers of glass or quartz have the problem of poor flexibility and processability for use in many applications. These types of optical fibers are disclosed in Japanese patent publication 47-816.

Others have proposed methods of making optical fibers that have a continuous distribution of refractive index from the cladding layer to the core of the optical fiber from polymeric materials. One such method is the manufacturing of a synthetic resin filament by an ionic grafting polymerization technique in which the concentration of metal ions is made to continuously change from the core of the fiber to the cladding layer. A polymeric optical fiber that has a continuous distribution of refractive index from the cladding to the core is thus produced. Such a method is described in Japanese patent publication 47-26913.

Another method proposed the making of a fiber from a mixture of two or more clear polymeric resin having different refractive indices. After a special solvents treatment, part of the mixture of the resin is dissolved to obtain an optical fiber. This technique is disclosed in a Japanese patent publication 47-28059.

Another method, disclosed in Japanese patent publication 54-30301, teaches a polymerization method in which two polymers having different refractive indices are used to form a polymer that has a continuous refractive index distribution from its surface layer to the center of the fiber.

Still another method disclosed a diffusion method of a monomer into the surface layer of a block copolymer such that the monomer content in the block copolymer forms a continuous distribution from its surface layer to the center of the block copolymer. A polymerization reaction is then performed to make a polymeric optical fiber that has a continuous refractive index distribution. This technique is disclosed in Japanese patent publications 52-5857, 56-37521 and 57-29682. It should be noted that all of the above methods and techniques disclosed are performed in a non-continuous, batch-type operation.

In order to overcome the deficiency of a non-continuous production process, continuous production methods were proposed by Japanese patent publication 1-1896021, 1-253704, 2-16505 and 2-233104. In these techniques, a polymer and a monomer are mixed in a mixing tank and heated until the polymer is dissolved in the monomer and uniformly mixed. A monofilament is then extruded from a die and fed into a gas evaporator. The gas is blown into the evaporator such that the monomer evaporates from the surface of the optical fiber. An optical fiber having a continuous concentration distribution of the monomer is thus formed. After a hardening process, a polymeric monofilament having a continuous refractive index distribution from its surface layer to its center is obtained.

The methods described above have several shortcomings such as a long diffusion time required which leads to excessive manufacturing time and low production rate, the difficulties in selecting optimal production conditions and the poor reproduceability. These problems must be solved before the methods can be used in a production environment.

It is therefore an object of the present invention to provide a method of manufacturing optical fibers of polymeric materials that have a continuous distribution of refractive indices from its cladding layer to the core of the fiber that does not have the shortcomings of the prior art methods.

It is another object of the present invention to provide a method of manufacturing optical fibers of polymeric materials that have a continuous distribution of refractive indices in the fiber that can be used in a continuous manufacturing process.

It is a further object of the present invention to provide a method of making optical fibers of polymeric materials that have a continuous distribution of refractive indices from the cladding layer to the core of the fiber that can be produced in a production process with a high degree of reproduceability.

SUMMARY OF THE INVENTION

In accordance with the present invention, a method of making an optical fiber from a polymeric material that has a continuous distribution of the refractive index from the cladding layer to the core of the fiber by a continuous production process is provided.

In the preferred embodiment, a continuous manufacturing method is provided by extruding an optical fiber from a polymeric solution containing two monomers having different refractive indices, and allowing the monomers to defuse in a diffusion region such that the two monomers are diffused into each other before the fiber is hardened.

The novel process produces a light/image transmitting polymeric optical fiber that has a refractive index distribution in the fiber capable of transmitting images. This type of light/image transmitting polymeric fiber can be used as optical lenses, optical fibers, or optical integrated circuits. The present invention therefore enables the production of such light/image transmitting columns with high optical transparency in a continuous process.

BRIEF DESCRIPTION OF THE DRAWINGS

Other objects, features and advantages of the present invention will become apparent upon consideration of the specification and the appended drawings in which.

DETAILED DESCRIPTION OF THE PREFERRED EMBODIMENT

Figure 1:
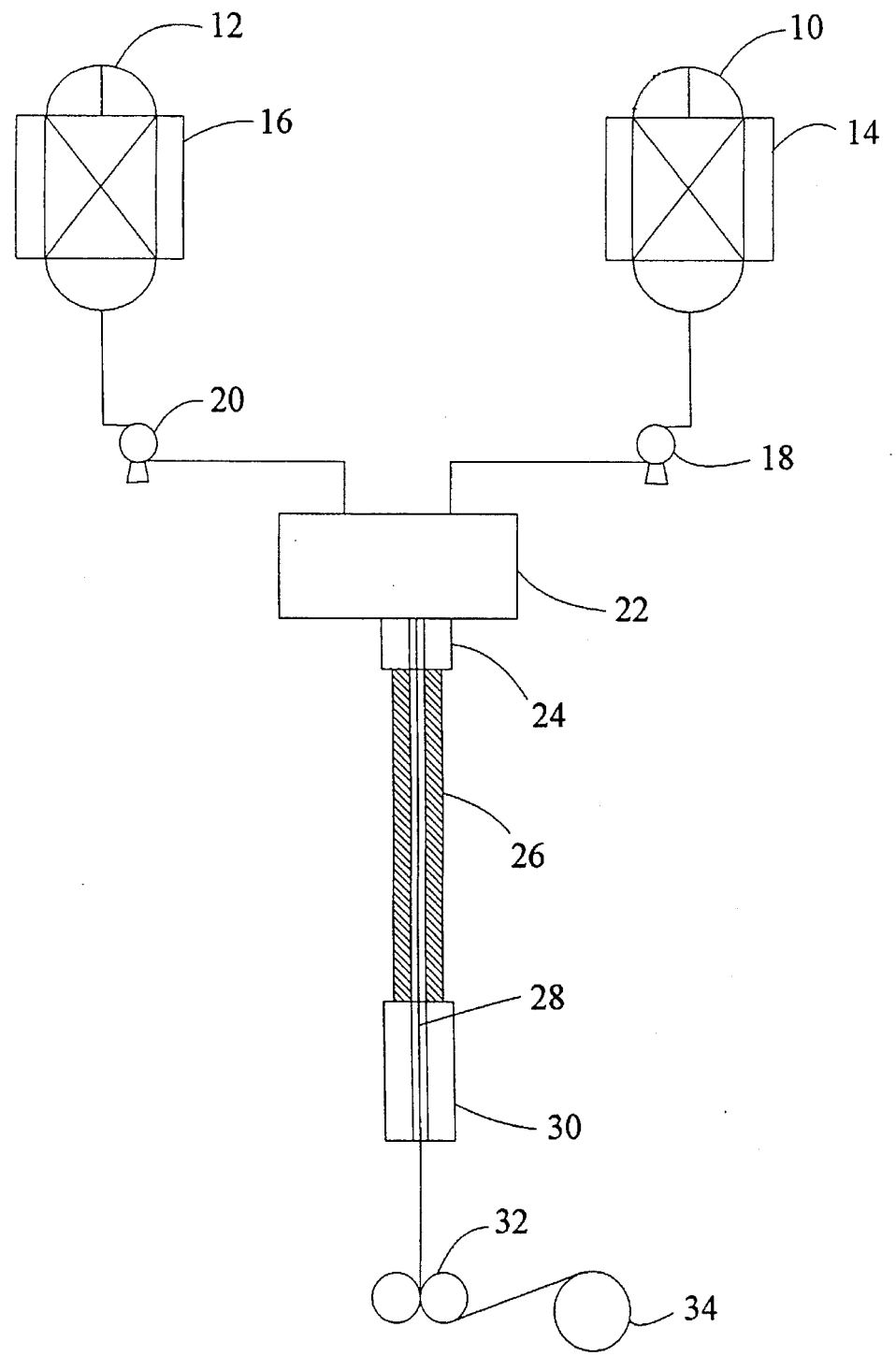
FIG. 1 is a schematic showing the apparatus used in the present invention method.

The present invention discloses a method of making a light/image transmitting optical fiber of polymeric material that has a continuous distribution of refractive indices from the cladding layer to the core of the fiber by a continuous manufacturing process.

The present invention provides a fiber having a continuous distribution of refractive indices by providing such distribution in the material of the fiber. The distribution of the refractive indices is normally in the shape of a parabolic curve. In an optical fiber that has a continuous distribution of refractive indices, the refractive index becomes smaller at a distance farther away from the core of the fiber. It is known that the speed of light in a medium is inversely proportional to the refractive index of the material. Therefore, for a light beam that deflects away from the center of the core, after repeated refraction in the fiber then returns to the center of the core. The light beam that proceeds at the center of the core at a lower speed due to its higher refractive index, while the speed of light that is reflected back from the outer layer proceed at a higher speed. The end result is that the time required to arrive at the end of the fiber is the same for both light beams. There is no light dispersion problem due to different mode of transmission. Furthermore, the diameter of this type of optical fibers is generally larger and similar to that of a step-index fiber and therefore, there is no splicing problem in application. The optical fibers of the present invention can be suitably used in telecommunications, data transmissions, image/light transmissions, and light detection.

In the present invention, a first mixture of a polymer and a monomer, which is a solvent for the polymer, or a first mixture of a polymer with two or more monomers including one that is a solvent for the polymer, and a second mixture of a polymer and a monomer which is different than the monomer contained in the first mixture are extruded through a concentric die into a dual-layer composite monofilament. The different monomers are allowed to diffuse in a diffusion region in the monofilament until such time that the two monomers are diffused into each other. The monofilament or fiber is then hardened into the final product.

The polymer used in the present invention is polymethyl methacrylate or a copolymer of methyl methacrylate and other monomers such as ethyl methacrylate, n-propyl methacrylate, isopropyl methacrylate, t-butyl methacrylate, cyclohexyl methacrylate, fluoro-alkyl methacrylate, 2-hydroxy methyl methacrylate, 2-phenoxyethyl methacrylate, glyceryl methacrylate, benzyl methacrylate, phenyl methacrylate. The polymer may also be a copolymer of methyl methacrylate with an acrylate such as methyl acrylate, ethyl acrylate, propyl acrylate or fluoro-alkyl acrylate. The polymer may also be a copolymer of methyl methacrylate and a methacrylic acid such as acrylic acid.

The monomer B and monomer C used in the present invention may include methyl methacrylate, ethyl methacrylate, n-propyl methacrylate, isopropyl methacrylate, t-butyl methacrylate, cyclohexyl methacrylate, phenyl methacrylate, benzyl methacrylate, fluoro-alkyl methacrylate, 2-hydroxy methyl methacrylate, 2-phenoxyethyl methacrylate, glaryl methacrylate, and acrylate type of monomers such as methyl acrylate, ethyl acrylate, propyl acrylate or fluoro-alkyl acrylate.

To practice the present invention, a first reactant mixture of a methyl methacrylate polymer and a monomer B and a second reactant mixture of a methyl methacrylate polymer and a monomer C are prepared. During the preparation, a heat activated hardener or a UV activated hardener is added to the mixtures. The content of monomer B or monomer C in the mixtures is in the range of between about 10 to about 80 weight percent, preferably between about 30 to about 80 weight percent, and more preferably between about 40 to about 70 weight percent of the total mixtures. A frequently used heat activated hardener is a peroxide type hardener, while typical UV activated hardeners are benzophenone and 1-hydroxycyclohexyl phenyl ketone.

In the present invention, when the two mixtures of polymer/monomer B and polymer/monomer C are made, the viscosities of the mixtures obtained are in the range between about $10^2$ to $10^5$ poise. At viscosities lower than $10^2$ poise, the frequent breakage of the monofilament makes it difficult to extrude such filament. At viscosities higher than $10^7$ poise, the extrusion process for the monofilament is difficult to carry out.

In the next process step, the two different reactant mixtures are extruded through a concentric die forming a composite monofilament having an inner layer and an outer layer of different materials. The extrusion process is conducted by following standard industry practice. After the extrusion process, monomer B and monomer C diffuses toward each other through a diffusion region which is the boundary between the inner layer and the outer layer. The extruded monofilament is then hardened by either a thermal activation means or by an UV activation means.

In order to achieve a superior image transmitting property, the distribution of the retractive index should conform to a second order parabolic curve.

In a monofilament made by the present invention method, the volume ratio of the inner and the outer layers of the composite monofilament extruded through the concentric die is in the range between about 1:1 to about 1:100, a preferred volume ratio of such inner and outer layers is between about 1:1 to about 1:10, and a more preferred volume ratio of such inner and outer layers is between about 1:1 to about 1:5.

As an optional processing step, during the diffusion period of the two monomers in the monofilament, the diffusion zone may be heated by conventional means if desired to further facilitate the diffusion process. However, such heating should not cause any further polymerization in the monofilament.

It may be preferred, but not necessary, to accelerate the hardening process of the monofilament by subjecting such filament to UV radiation or heat treatment. Suitable radiation sources are, for instance, carbon arc lamp at between 150 nm to 600 nm wavelength, high pressure mercury lamps, super high pressure mercury lamp, low pressure mercury lamps, electrodeless lamps, xenon lamps or a laser source.

Referring now to FIG. 1 which shows a schematic of the apparatus used in the present invention. Material supply tank 10 contains the solution of a polymer and at least one monomer B, while material supply tank 12 contains the solution of a polymer and at least one monomer C. Heating means 14 and 16 are used to facilitate the dissolution of the polymer in monomer B and in monomer C. The solutions are normally heated to a predetermined temperature of higher than room temperature. Volumetric pumps 18 and 20 are used to feed the two reactant mixtures at predetermined flow rates into the concentric die 22. A dual-layer composite monofilament 24 is extruded out of an orifice (not shown) of die 22 and fed into an enclosed diffusion zone 26. While going through the diffusion zone 26 for a time period of not less than 1 sec, the monomer in the outer layer and the monomer in the inner layer diffuses into each other to produce the effect of a continuous distribution of refractive index in the filament. The monofilament 24 is then fed through a hardening zone 30 where it is hardened. The monofilament 24 is taken up through rollers 32 by a take-up roll 34 after hardening.

EXAMPLE 1

A first reactant mixture for the inner layer (or the core) is made up of 70 parts by weight of methyl methacrylate polymer, 28 parts by weight of a monomer of benzyl methacrylate, 14 parts by weight of methyl methacrylate monomer, 0.5 parts by weight of 1-hydroxycyclohexyl phenyl ketone, and 0.1 parts by weight of hydroquinone. The total parts by weight of the first reactant mixture is approximately 100. A second reactant mixture for the outer layer (or the cladding layer) consists of 60 parts by weight of a methyl methacrylate polymer, 40 parts by weight of a monomer of methyl methacrylate, 0.5 parts by weight of 1-hydroxycyclohexyl phenyl ketone, and 0.1 parts by weight of hydroquinone. The total parts by weight of the second reactant mixture is approximately 100. The two reactant mixtures are pumped through an oriface of a concentric die simultaneously.

Using the apparatus shown in FIG. 1, after the composite monofilament 24 passes through approximately 45 cm long enclosed diffusion zone at approximately 80° C., the monofilament 24 is passed through a hardening zone 30 which contains four equally spaced 60 cm long high pressure mercury lamps for hardening. The resulting monofilament obtained has a volumetric ratio of the core layer to the cladding layer of 1:3.

Figure 2:
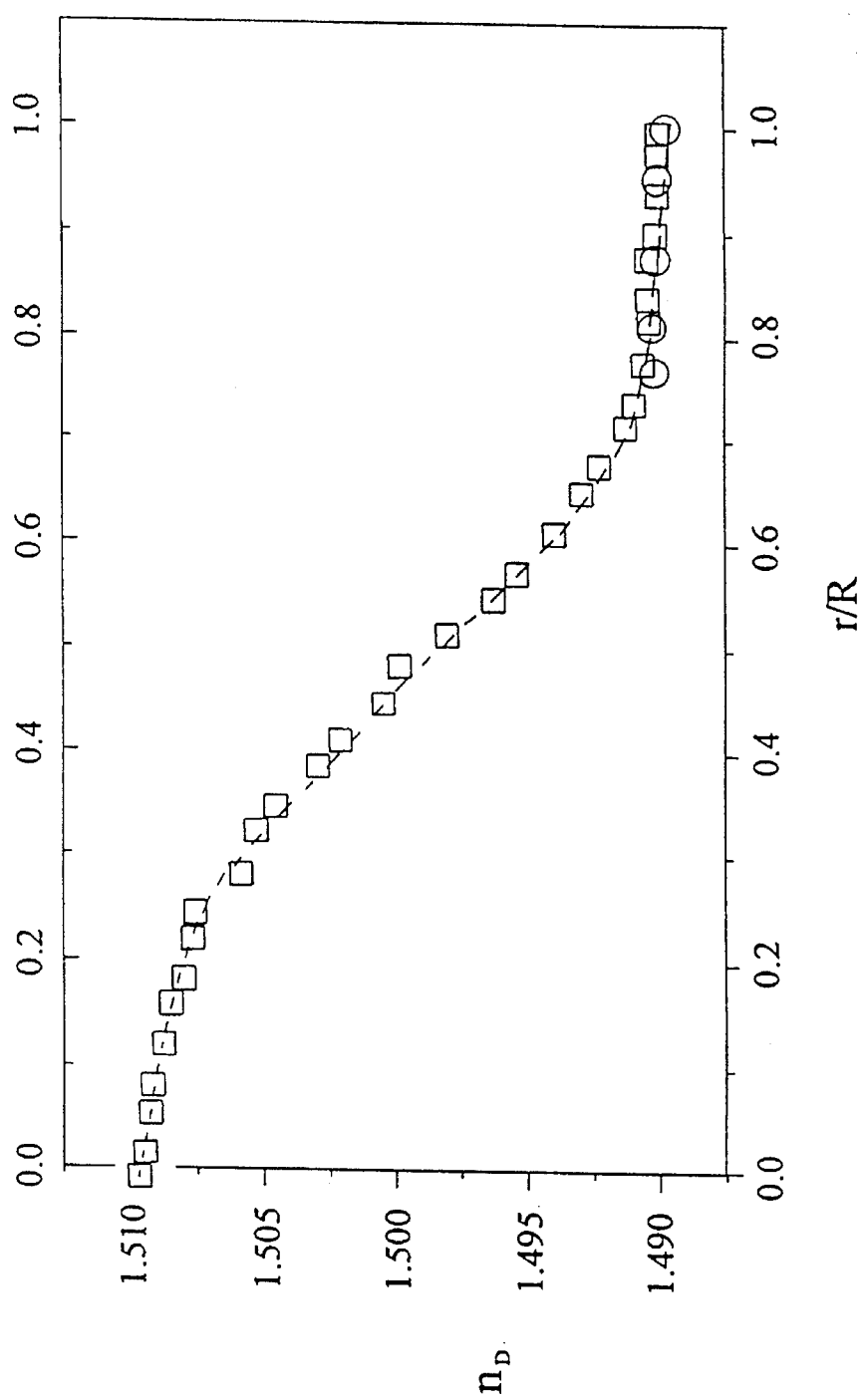
FIG. 2 is a graph showing the distribution of the refractive index in the radius direction of an optical fiber.

The monofilament or fiber has a diameter of 1 mm. The distribution of the refractive index was found to be 1.509 at the core of the filament and 1.490 at the cladding layer of the filament. Data of the refractive index is determined by using an Interfaco interference microscope and shown in FIG. 2. It is also discovered that the monofilament showed a continuous reduction of the refractive index from the center of the filament to the outer periphery of the filament. There is no distortion of images transmitted by the light/image transmitting optical fiber.

EXAMPLE 3

A first reactant mixture for the inner layer (or the core) is made up of 55 parts by weight of methyl methacrylate, 45 parts by weight of a monomer of methyl methacrylate, 0.5 parts by weight of 1-hydroxycyclohexyl pheriyl ketone, and 0.1 parts by weight of hydroquinone. The total parts by weight of the first reactant mixture is approximately 100. A second reactant mixture for the outer layer (or the surface layer) consists of 60 parts by weight of methyl methacrylate polymer, 40 parts by weight of a monomer of methyl methacrylate, 0.5 parts by weight of 1-hydroxycyclohexyl phenyl ketone, and 0.1 parts by weight of hydroquinone. The total parts by weight of the second reactant mixture is approximately 100. The two reactant mixtures are pumped through an oriface of a concentric die simultaneously.

Using the apparatus shown in FIG. 1, after the composite monofilament 24 passes through approximately 55 cm long enclosed diffusion zone at 90° C., the monofilament 24 is passed through a hardening zone 30 which contains four equally spaced 60 cm long high pressure mercury lamps for hardening. The resulting monofilament obtained has a volumetric ratio of the inner layer to the outer layer of 1:3.

The monofilament or fiber has a diameter of 1 mm. The distribution of the refractive index was found to be 1.526 at the center of the filament and 1.490 at the outer layer of the filament. Data of the refractive index is determined by using an Interfaco interference microscope. It is also discovered that the monofilament showed a continuous reduction of the refractive index from the center of the filament to the outer periphery of the filament. There is no distortion of images transmitted by the light/image transmitting monofilament.

While the present invention has been described in an illustrative manner, it should be understood that the terminology used is intended to be in a nature of words of description rather than of limitation.

Furthermore, while the present invention has been described in terms of a preferred embodiment and an alternate embodiment thereof, it is to be appreciated that those skilled in the art will readily apply these teachings to other possible variations of the invention.

The embodiments of the invention in which an exclusive property or privilege is claimed are defined as follows:

We claim:

1. A method of producing a composite optical fiber of polymeric materials having a continuous refractive index distribution from the center of the fiber to the outer layer of the fiber comprising the steps of:

providing a first mixture of a first polymer and at least one first monomer that is a solvent for said first polymer, providing a second mixture of a second polymer and at least one second monomer that is a solvent for said second polymer, said at least one second monomer being different from said at least a one first monomer, flowing said first and said second mixtures through a concentric die equipped with an orifice such that a composite optical fiber having an inner layer and an outer layer formed by said first and said second mixtures, respectively, having an interface there in-between is obtained, passing said composite optical fiber through a diffusion apparatus for a sufficient length of time such that a sufficient amount of said first and said second monomers diffuses across said interface into said outer layer and said inner layer, respectively, and passing said composite optical fiber through a hardening fixture such that said composite optical fiber is hardened by a radiation energy or an oxidation/reduction process without removing an outermost layer of said fiber, wherein said composite optical fiber formed has a diameter between about 0.1 mm to about 5 mm.

2. A method according to claim 1, wherein said first and said second polymer are selected from a group consisting of polymethyl methacrylate and a copolymer formed of methyl methacrylate and a monomer selected from the group consisting of ethyl methacrylate, n-propyl methacrylate, isopropyl methacrylate, t-butyl methacrylate, cyclohexyl methacrylate, fluoro-alkyl methacrylate, 2-hydroxy methyl methacrylate, 2-phenoxyethyl methacrylate, glyceryl methacrylate, benzyl methacrylate, phenyl methacrylate, methyl acrylate, ethyl acrylate, propyl acrylate, fluoro-alkyl acrylate and acrylic acid.

3. A method according to claim 1, wherein said at least one first monomer and said at least one second monomer are selected from the group consisting of methyl methacrylate, ethyl methacrylate, n-propyl methacrylate, isopropyl methacrylate, t-butyl methacrylate, cyclohexyl methacrylate, phenyl methacrylate, benzyl methacrylate, fluoro-alkyl methacrylate, 2-hydroxy methyl methacrylate, 2-phenoxyethyl methacrylate, glaryl methacrylate, methyl acrylate, ethyl acrylate, propyl acrylate and fluoro-alkyl acrylate.

4. A method according to claim 1, wherein at least one of said first reactant mixture and said second reactant mixture is heated to a predetermined temperature to facilitate the formation of said reactant mixture.

5. A method according to claim 1, wherein at least one of said first reactant mixture and said second reactant mixture further comprises a catalyst.

6. A method of producing a composite optical fiber of polymeric materials having a continuous refractive index distribution from the center of the fiber to the outer layer of the fiber comprising the steps of:

providing a first mixture of a first polymer and at least one first monomer that is a solvent for said first polymer, providing a second mixture of a second polymer and at least one second monomer that is a solvent for said second polymer, said at least one second monomer being different from said at least one first monomer, flowing said first and said second mixtures through a concentric die equipped with an orifice such that a composite optical fiber having an inner layer and an outer layer formed by said first and said second mixtures, respectively, having an interface there in-between is obtained, passing said composite optical fiber through a diffusion apparatus for a sufficient length of time such that a sufficient amount of said first and said second monomers diffuses across said interface into said outer layer and said inner layer, respectively, and passing said composite optical fiber through a hardening fixture such that said composite optical fiber is hardened by a radiation energy or an oxidation/reduction process without removing an outermost layer of said fiber, wherein the volume ratio between said inner layer and said outer layer is between about 1:1 and about 1:100.

7. A method to claim 6, wherein the volume ratio between said inner layer and said outer layer is preferably between about 1:1 and about 1:10.

8. A method according to claim 6, wherein the volume ratio between said inner layer and said outer layer is more preferably between about 1:1 and about 1:5.

9. A method according to claim 1, wherein the refractive index of said first polymer is higher or equal to the refractive index of said second polymer.

10. A method of producing a composite optical fiber of polymeric materials having a continuous refractive index distribution from the center of the fiber to the outer layer of the fiber comprising the steps of:

providing a first mixture of a first polymer and at least one first monomer that is a solvent for said first polymer, providing a second mixture of a second polymer and at least one second monomer that is a solvent for said second polymer, said at least one second monomer being different from said at least one first monomer, flowing said first and said second mixtures through a concentric die equipped with an orifice such that a composite optical fiber having an inner layer and an outer layer formed by said first and said second mixtures, respectively, having an interface there in-between is obtained, passing said composite optical fiber through a diffusion apparatus for a sufficient length of time such that a sufficient amount of said first and said second monomers diffuses across said interface into said outer layer and said inner layer, respectively, and passing said composite optical fiber through a hardening fixture such that said composite optical fiber is hardened by a radiation energy or an oxidation/reduction process without removing an outermost layer of said fiber, wherein the total weight or said at least one first monomer sand said at least one second monomer is between about 10 to about 80 percent of the total weight of said optical fiber, and more preferably between about 40 to about 70 percent of the total weight of said optical fiber.

11. A method according to claim 1, wherein said optical fiber may be elongated to obtain a desirable diameter before the hardening step.

12. A composite optical fiber of polymeric materials comprising:

a core formed by the polymerization of a first polymer dissolved in at least one first monomer solvent, a surface layer formed by the polymerization of a second polymer dissolved in at least one second monomer solvent, and an interface between said core and said surface layer across which a sufficient amount of said at least one first monomer being diffused into said surface layer and a sufficient amount of said at least one second monomer being diffused into said core to cause the formation of a continuous distribution of refractive index from a center of said core to the outermost layer of said surface layer of the fiber, wherein said fiber has a diameter between about 0.1 mm to about 5 mm.

13. A composite optical fiber according to claim 12, wherein said first and said second polymer are selected from a group consisting of polymethyl methacrylate and a copolymer formed of methyl methacrylate and a monomer selected from the group consisting of ethyl methacrylate, n-propyl methacrylate, isopropyl methacrylate, t-butyl methacrylate, cyclohexyl methacrylate, fluoro-alkyl methacrylates 2-hydroxy methyl methacrylate, 2-phenoxyethyl methacrylate, glyceryl methacrylate, benzyl methacrylate, phenyl methacrylate, methyl acrylate, ethyl acrylate, propyl acrylate, fluoro-alkyl acrylate and acrylic acid.

14. A composite optical fiber according to claim 12, wherein said at least one first monomer solvent and said at least one second monomer solvent are selected from the group consisting of methyl methacrylate, ethyl methacrylate, n-propyl methacrylate, isopropyl methacrylate, t-butyl methacrylate, cyclohexyl methacrylate, phenyl methacrylate, benzyl methacrylate, fluoro-alkyl methacrylate, 2-hydroxy methyl methacrylate, 2-phenoxyethyl methacrylate, glaryl methacrylate, methyl acrylate, ethyl acrylate, propyl acrylate and fluoro-alkyl acrylate.

15. A composite optical fiber according to claim 12, wherein at least one of the polymerization process for said core and said surface layer is assisted by a catalyst.

16. A composite optical fiber of polymeric materials comprising:

a core formed by the polymerization of a first polymer dissolved in at least one first monomer solvent, a surface layer formed by the polymerization of a second polymer dissolved in at least one second monomer solvent, and an interface between said core and said surface layer across which a sufficient amount of said at least one first monomer being diffused into said surface layer and a sufficient amount of said at least one second monomer being diffused into said core to cause the formation of a continuous distribution of refractive index from a center of said core to the outermost layer of said surface layer of the fiber, wherein the volume ratio between said core and said surface layer is between about 1:1 and about 1:100.

17. A composite optical fiber according to claim 16, wherein the volume ratio between said core and said surface layer is preferably between about 1:1 and about 1:10.

18. A composite optical fiber according to claim 16, wherein the volume ratio between said core and surface layer is more preferably between 1:1 and about 1:5.

* * * * *